United States Patent
Fetzer et al.

(10) Patent No.: US 9,924,103 B2
(45) Date of Patent: Mar. 20, 2018

(54) AUTOMATED LOCAL POSITIONING SYSTEM CALIBRATION USING OPTICALLY READABLE MARKERS

(71) Applicant: The Boeing Company, Chicago, IL (US)

(72) Inventors: Barry A. Fetzer, Renton, WA (US); James J. Troy, Issaquah, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 308 days.

(21) Appl. No.: 14/682,870

(22) Filed: Apr. 9, 2015

(65) Prior Publication Data

US 2016/0300354 A1    Oct. 13, 2016

(51) Int. Cl.
*H04N 5/232* (2006.01)
*G01B 11/14* (2006.01)
(Continued)

(52) U.S. Cl.
CPC ......... *H04N 5/23296* (2013.01); *G01B 11/14* (2013.01); *G06K 9/00664* (2013.01);
(Continued)

(58) Field of Classification Search
CPC ........ G01S 17/875; G01S 5/163; G01S 17/74; G01S 17/88; G01S 17/46; G06T 7/251; G06T 2207/10016; G06T 2207/30241; G06T 7/246; G06T 7/00; G06T 7/60; G06T 7/285; G06T 2207/10021; G06T 2207/30208; G06T 2207/30201; G06T 17/20; G06T 7/593; G06T 7/73; G06T 2207/30204; G06T 7/80; G06T 2207/30248; G06K 9/62; G06K 9/52; G06K 9/3216; G06K 9/3241; G06K 2009/3225; G06K 9/00228; G06K 9/4638; G06K 9/3275; G06K 9/4652; G06K 9/00221;
(Continued)

(56) References Cited

U.S. PATENT DOCUMENTS 6,061,644 A  *  5/2000  Leis .................... G01S 5/163
                                                    382/103
6,091,833 A  *  7/2000  Yasui .................. G05D 1/0246
                                                    348/118

(Continued)

*Primary Examiner* — Dramos I Kalapodas
(74) *Attorney, Agent, or Firm* — Gates & Cooper LLP (57) ABSTRACT

An improved mechanism for calibrating a local positioning system through the use of passive or retro-reflective markers is described herein. A plurality of imaging targets with the passive or retro-reflective markers may be attached or affixed on a surface of an object. The local positioning system may then capture a first image of the imaging targets in a non-illuminated state and further capture a second image of the imaging targets in an illuminated state. A difference image between the first and second captured images may be computed and then segmented. The local positioning system may then identify the plurality of imaging targets based on the segmented difference image and position itself to extract information. The extracted information may then be used to help calibrate the local positioning system.

20 Claims, 10 Drawing Sheets

(51) Int. Cl.
*G06K 9/00* (2006.01)
*G06T 7/73* (2017.01)
*G06T 7/174* (2017.01)
*G06K 9/32* (2006.01)

(52) U.S. Cl.
CPC ............... *G06T 7/174* (2017.01); *G06T 7/73* (2017.01); *G06K 2009/3225* (2013.01); *G06T 2207/10152* (2013.01); *G06T 2207/20224* (2013.01); *G06T 2207/30204* (2013.01)

(58) Field of Classification Search
CPC ........... G06K 9/00234; G06K 9/00261; G06K 2019/06243; G06K 9/4633; G06K 19/06028; H04N 5/225; H04N 5/232; H04N 7/183; H04N 5/23222; H04N 5/23296; G01B 11/14; Y10S 901/46; G06F 17/16; G06F 3/00; G02B 2027/0187; G02B 2027/0138; G02B 27/0189; B42D 15/00; B66C 13/46; B66C 19/002; A61B 34/00; A61B 34/20
See application file for complete search history.

(56) References Cited

U.S. PATENT DOCUMENTS

| | | | | |
|---|---|---|---|---|
| 6,405,072 B1* | 6/2002 | Cosman | ............. | G06T 7/73 600/426 |
| 6,556,722 B1* | 4/2003 | Russell | ............. | G01S 5/16 348/94 |
| 7,720,259 B2* | 5/2010 | Gordon | ............. | G06T 7/251 348/169 |
| 7,859,655 B2* | 12/2010 | Troy | ............. | G01C 1/04 348/169 |
| 7,889,197 B2* | 2/2011 | Kraver | ............. | G06K 9/00228 345/420 |
| 8,044,991 B2* | 10/2011 | Lea | ............. | G01C 11/00 348/207.1 |
| 8,082,120 B2* | 12/2011 | St-Pierre | ............. | G01C 11/02 356/601 |
| 8,267,264 B2* | 9/2012 | Bryfors | ............. | B66C 19/002 212/270 |
| 8,744,133 B1 | 6/2014 | Troy et al. | | |
| 2005/0054910 A1* | 3/2005 | Tremblay | ............. | A61B 5/055 600/411 |
| 2005/0269412 A1* | 12/2005 | Chiu | ............. | G06K 9/4633 235/462.03 |
| 2010/0092079 A1* | 4/2010 | Aller | ............. | G06K 9/3216 382/165 |
| 2010/0102980 A1* | 4/2010 | Troy | ............. | G01C 15/00 340/686.6 |
| 2011/0115922 A1* | 5/2011 | Shimizu | ............. | G06T 7/80 348/188 |
| 2014/0022281 A1 | 1/2014 | Georgeson et al. | | |
| 2014/0376768 A1 | 12/2014 | Troy et al. | | |
| 2016/0198069 A1* | 7/2016 | Boyle | ............. | G06T 3/4038 348/81 |
| 2016/0267806 A1* | 9/2016 | Hsu | ............. | G09B 19/24 |

\* cited by examiner

AUTOMATED LOCAL POSITIONING SYSTEM CALIBRATION USING OPTICALLY READABLE MARKERS

BACKGROUND

Local positioning systems have historically been calibrated either through the application of active markers or by way of user input. Both procedures have a tendency to be a painstaking and time consuming process. Further, manual user inputs are subject to human error. Thus, there exists an opportunity to improve and provide a more efficient way of calibrating a local positioning system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One way to improve efficiency is to provide a less time consuming approach in locating and extracting information from specific imaging targets. For example, passive markers, e.g., such as retro-reflective markers, may be used. With the process of applying passive markers to specific imaging targets, the local positioning system may quickly locate the specific targeted areas of interest and extract information from those areas. The extracted information may then be used to calibrate the local positioning system. Hence, by using passive markers, the processing time to perform such actions as locating specific imaging targets, extracting information from the targets, and then calibrating the local positioning system may be decreased.

In illustrative embodiments of the present invention, a system and method are provided for calibrating a local positioning system through the use of passive markers. In these embodiments, the local positioning system includes one or more computing devices. Additionally, one or more memories include computer-readable instructions and when executed by the computing device, first and second images of a plurality of imaging targets are captured. The first image is captured while the imaging targets are in a first state of illumination, and the second image is captured while the imaging targets are in a second state of illumination that is different from the first state of illumination. Alternatively, the first image can be captured while the imaging targets are in a non-illuminated state, and the second image can be captured while the imaging targets are in an illuminated state. The particular order of capturing the imaging targets either in the first/second state of illumination or in the non-illuminated/illuminated state are not limited to the steps as described in the following Detailed Description and Claims. In other words, in alternate embodiments, the first image may be captured while the imaging targets are in the illuminated state, and the second image may be captured while the imaging targets are in a non-illuminated state. A difference image is then generated using the first and second captured images. The center point of each of the plurality of imaging targets, represented in three-dimensional coordinates, is identified and information or data is extracted from each of the plurality of imaging targets. The extracted information is in a form that can be understood by a computer. Based at least in part on the extracted information or data, the local positioning system is calibrated.

BRIEF DESCRIPTION OF DRAWINGS

The foregoing Summary, as well as the following Detailed Description, are better understood when read in conjunction with the appended drawings. In order to illustrate the present disclosure, various aspects of the disclosure are shown. However, the disclosure is not limited to the specific aspects discussed. The following figures are included.

DETAILED DESCRIPTION

In production environments where local positioning systems are used, there exists an increased demand for improvements and more efficient ways to control workflow. The conventional technique, such as manually inputting imaging targets, is one approach to calibrate or orient a local positioning system. However, manual user inputs are subject to human error. Another potential approach is to use long range optical code readers to locate and read codes in areas of interest. Unfortunately, the codes are often difficult to automatically locate within a reasonable amount of time if the optical code reader is not setup in the correct position to begin with. Another approach in calibrating a local positioning system is achieved through the application of active markers (i.e., LED markers). LED markers are strategically placed throughout different areas on an object. The local positioning system, using a video camera, would then scan the surface of the object to find these active markers. However, the use of active markers may require significant time to setup and significant maintenance costs to monitor and control.

As technology in both local positioning systems and in imaging processing systems become more advanced, it becomes more important to expedite the process of locating imaging targets in a manageable yet efficient manner. Locating imaging targets quickly and efficiently would, in turn, decrease the overall time it takes to calibrate a local positioning system. Therefore, a procedure that locates, captures, and extracts information from specific imaging targets on surfaces of objects in a timely and efficient manner is preferred. Furthermore, a procedure that reduces the possibility of error and decreases the costs associated with setting up the system is also preferred.

Disclosed herein is a method and system with an improved mechanism for calibrating local positioning systems. Various systems, methods, and computer program products may be employed in conjunction with the practice of various aspects of the present disclosure. Aspects of the present disclosure may be employed in an improved mechanism for calibrating local positioning systems. This may comprise attaching a plurality of passive markers (e.g., retro-reflective markers) onto a surface of an object. The plurality of passive markers would circumscribe or surround a plurality of imaging targets. Industries, companies, and individuals may all leverage such an approach to improve the efficiency of locating and extracting information from any given area. For example, a camera-equipped local positioning system may scan the surface of an object to locate imaging targets. Once the imaging targets are identified, the camera may then be configured to capture information (i.e., position information) from each of the plurality of imaging targets. The information captured from the imaging targets may then be used to assist in the calibration process of the local positioning system.

Figure 1:
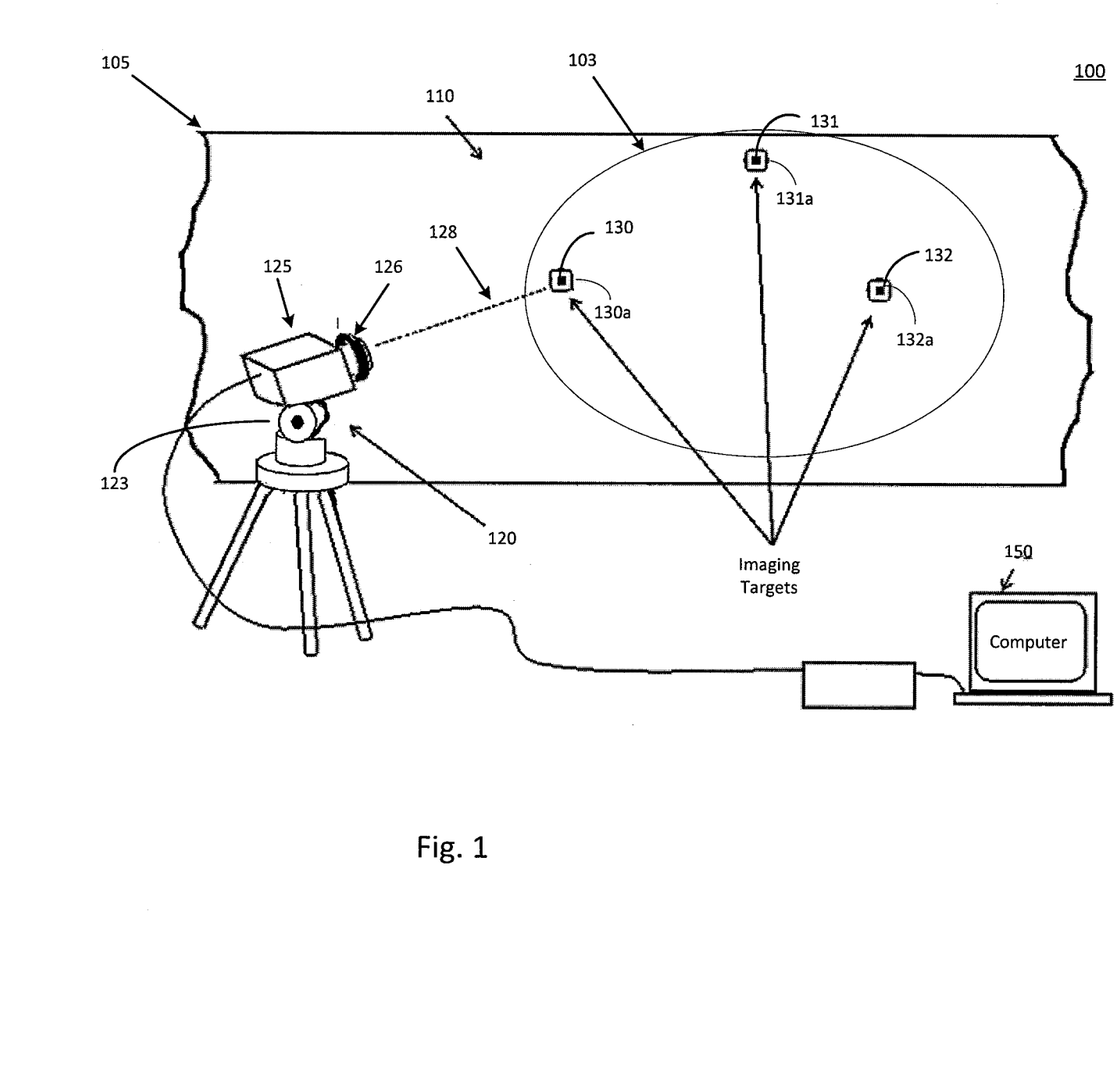
FIG. 1 is a schematic view of a local positioning system configured to capture a first image of a plurality of imaging targets in a non-illuminated state.

Referring now to FIG. 1, a system 100 includes an improved mechanism for calibrating a local positioning system 120. The system 100 may comprise one or more computing devices 150. The computing device 150 may be a notebook computer, for example.

The local positioning system 120 may further comprise three-dimensional localization software which is loaded into the computing device 150. The placement of the local positioning system 120 in system 100 may be pre-determined by a user. In one example, the local positioning system 120 may be set up on a tripod and positioned in front an object 105 of interest. In another example, the local positioning system 120 may be placed on a mobile platform. By placing the local positioning system 120 on a mobile platform, a user may then conveniently control the movement and direction of the local positioning system 120. In furtherance of the example, a user may control the mobile platform either through a keyboard (not pictured) of the computing device 150, a wireless handheld device (not pictured), or with a separate joystick (not pictured). The user may direct the mobile platform such that the local positioning system 120 is aiming at the object 105 of interest.

The local positioning system 120 in this embodiment is equipped with a video camera 125. The camera 125 may have automated (remotely controlled) zoom capabilities. The camera 125 may additionally include an integral crosshair generator to facilitate precise location of a point within an optical image field display of the camera 125. The camera 125 may be supported on a pan-tilt mechanism 123, and both the camera 125 and the pan-tilt mechanism 123 may be operated by the computing device 150. The computing device 150 may communicate with the video camera 125 and the pan-tilt mechanism 123 through a video/control cable. Alternatively, the computing device 150 may communicate with the video camera 125 and the pan-tilt mechanism 123 through a wireless communication pathway (not shown). Even further, in an alternative embodiment, the computing device 150 may be integrated with the camera 125. Control of the pan-tilt mechanism 123 and therefore, the orientation of the video camera 125 may be controlled using the computing device 150 keyboard (not pictured) or any other input device.

The pan-tilt mechanism 123 may be controlled to positionally adjust the camera 125 to selected angles around a vertical, azimuth (pan) axis and a horizontal, elevation (tilt) axis. A direction vector (not pictured), that describes the orientation of the camera 125 relative to the fixed coordinate system of the tripod (or other platform on which the pan-tilt unit is attached), may be determined from the pan and tilt angles, as well as the position of the center of crosshair marker in the optical field when the camera 125 is aimed at a point of interest on an object 105. This direction vector can be depicted as a line extending from the lens of the camera 125 and intersecting a location on an object 105.

A laser range meter may be incorporated inside the housing of camera 125 or mounted to the outside of camera 125 in such a way that it transmits a laser beam 128 along the direction vector. The laser range meter may be configured to measure distances to the object 105. The laser range meter may have a laser and a unit configured to compute distances based on the laser light detected in response to laser light reflected on the object 105.

The camera 125 may also be equipped with a ring light 126. The ring light 126 may be equipped with a low-powered (i.e., battery powered) light source or any other light source with similar functionality. In this embodiment, the ring light 126 surrounds the lens of the camera 125 or is placed directly adjacent to the camera 125. Further, in this illustrative embodiment, the ring light 126 may be in either of two states: on or off. In other words, the ring light 126 may either be activated or de-activated. In the on-state, the ring light 126 provides illumination; and, in the off-state, the ring light 126 provides no illumination.

The system 100 in the illustrative embodiment also comprises a plurality of imaging targets (e.g., calibration points) 130-132 that are affixed, attached, or placed on a surface 110 of object 105. Typically, at least three imaging targets 130-132 are required in order to properly calibrate the local positioning system 120. The three-dimensional localization software in the computing device 150 uses the imaging targets 130-132 on the object 105 to define the location (position and orientation) of the camera 125 relative to object 105.

The process of affixing the imaging targets 130-132 onto the surface 110 of the object 105 may be achieved through various implementations. For example, the imaging targets 130-132 may be manufactured and entrenched into the surface 110 of the object 105 during production. In another example, a user may affix the imaging targets 130-132 onto the surface 110 through the application of stickers. It may be noted, however, that various other implementations may also be used to affix imaging targets 130-132 to the surface 110 of the object 105.

The object 105 in FIG. 1, in one example, may comprise an airplane wing or a fuselage of an airplane. Generally, the object 105 may comprise a flat surface. However, there may be various implementations where the object 105 may not comprise a completely flat surface such that the object 105 may have significant contoured portions.

Further referencing FIG. 1, the plurality of imaging targets 130-132 in system 100 may be bounded by a plurality of passive markers 130a-132a. For example, imaging target 130 may be bounded by passive marker 130a. The passive markers 130a-132a may contain retro-reflective materials that are capable of reflecting light back to the source when displayed under a controlled light source. The reflective portion of the passive markers 130a-132a may comprise: retro-reflective tape, reflective fabric tape, or reflective tape including microspheres. In alternate embodiments, the reflective portion may also include other types of passive markers 130a-132a that may show up differently under different lighting conditions. For example, passive markers 130a-132a that fluoresce under a blacklight (such as ultraviolet or infrared paint) may also be used. The process of applying the passive markers 130a-132a onto the surface 110 of object 105 may be performed through various implementations. For one example, a user may physically apply the passive markers 130a-132a as stickers surrounding or circumscribing the imaging targets 130-132. In another example, the passive markers 130a-132a may be manufactured and entrenched onto the surface 110 of the object 105 during production. In another example, the passive markers 130a-132a and the imaging targets 130-132 may be manufactured together as a single sticker (unit) and further applied to the surface 110 of object 105.

Figure 2:
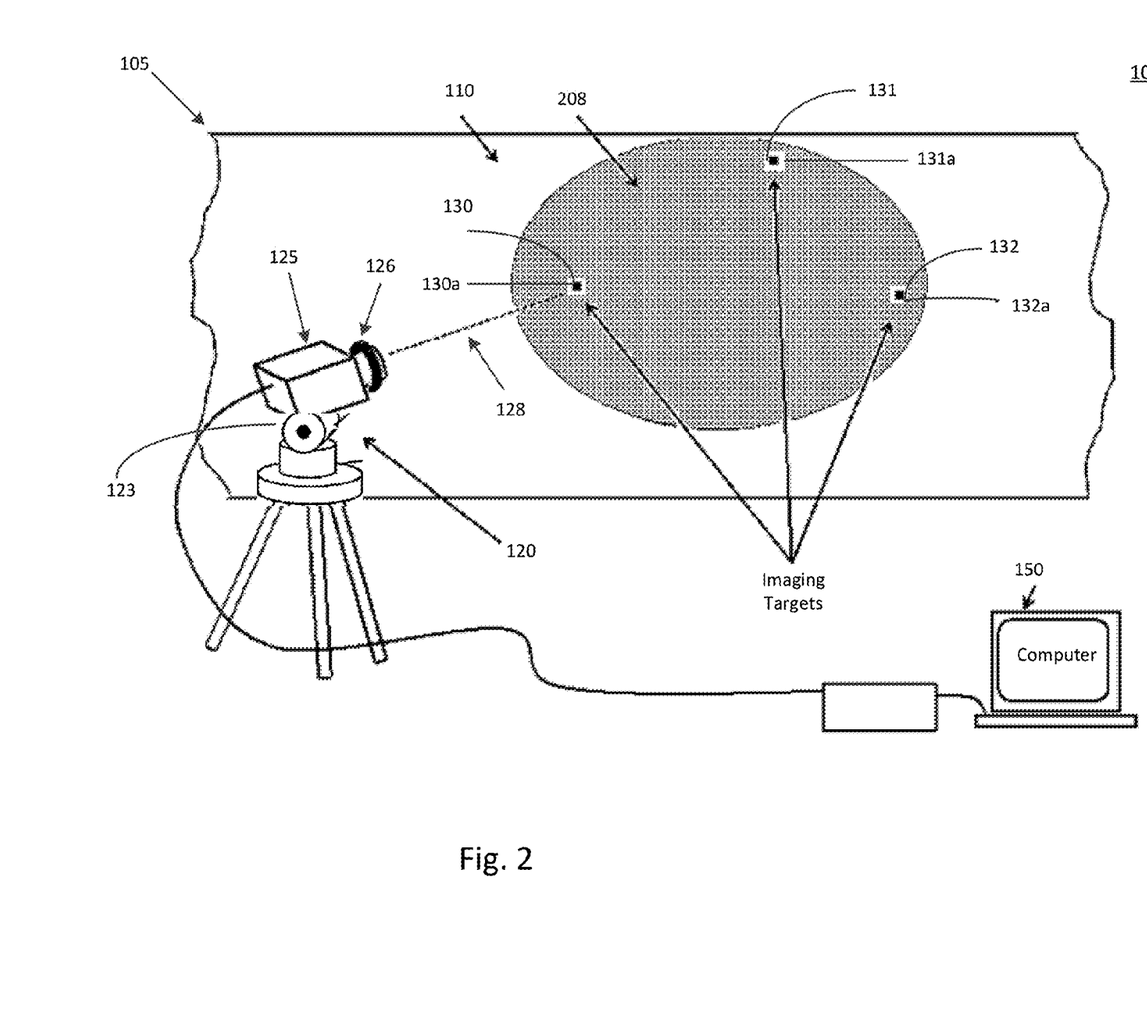
FIG. 2 is a schematic view of a local positioning system configured to capture a second image of a plurality of imaging targets in an illuminated state.

Looking again to FIG. 1, the system 100 may capture a non-illuminated first image (shown in more detail in FIG. 4) of the imaging targets 130-132 located on object 105. The system 100 may direct the camera 125 on the local positioning system 120 to capture the non-illuminated first image. As shown here in FIG. 1, the camera 125, while having the ring light 126 in the off-state, may capture the first image of imaging targets 130-132 that are located within a non-illuminated region 103. The non-illuminated region 103 may be a region that falls within the camera's 125 field-of-view and further contains the imaging targets 130-132. The non-illuminated first image may then be sent and stored in a database or memory of the computing device 150 for post-processing. FIG. 2 will provide further description of capturing a second image while the ring light 126 is in the on-state.

FIG. 2 depicts an illustration of the system 100 capturing a second image (shown in more detail in FIG. 4) with the ring light 126 in the on-state. While the ring light 126 is in the on-state, the local positioning system 120 may direct the camera 125 and illuminate a light source onto the surface 110 of object 105. Therefore, an illuminated region 208 may be created. The camera 125 may then capture then second image inside the illuminated region 208 that contains the imaging targets 130-132. The illuminated region 208 referenced here in FIG. 2 may be the same region 103 captured in the first image as described in FIG. 1. Because each one of the imaging targets 130-132 may be circumscribed by passive or retro-reflective markers 130a-132a, the illumination from the ring light 126 may cause the imaging targets 130-132 to stand out and reflect the light back to the source. As such, the local positioning system 120 may then be able to identify the relative positions of each of the imaging targets 130-132. The captured second image may also be sent and stored in a database of the computing device 150 for post-processing.

Figure 3:
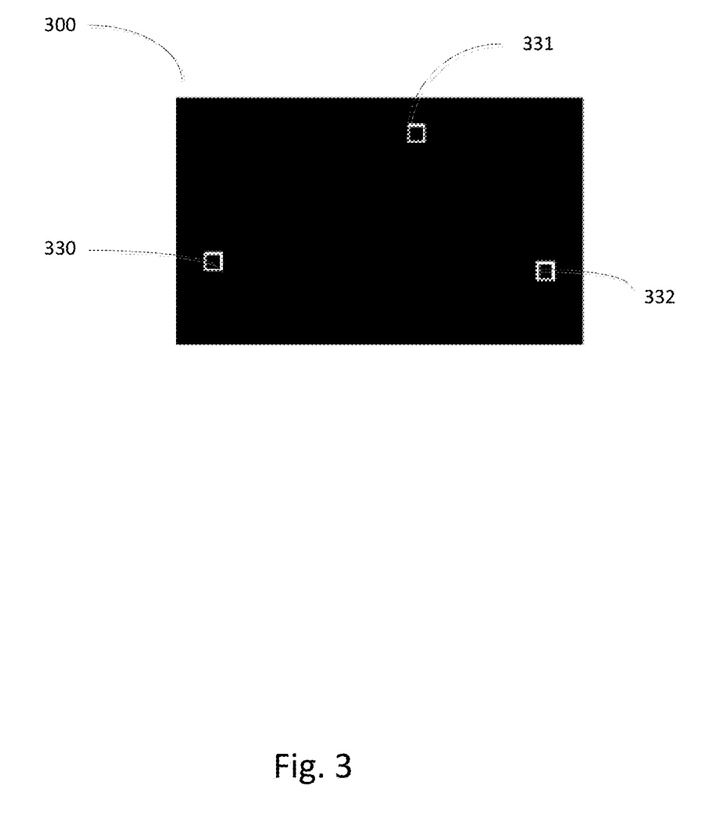
FIG. 3 is a schematic view of a generated difference image using the first and second captured images of FIGS. 1 and 2.

FIG. 3 depicts an illustration of the system 100 generating a difference image 300 using the first and second captured images as described in FIGS. 1 and 2. The generated difference image 300 may be used to determine the locations of each imaging target 130-132. In one implementation, for example, the generation of a difference image 300 may be achieved through the procedures described below.

Figure 4:
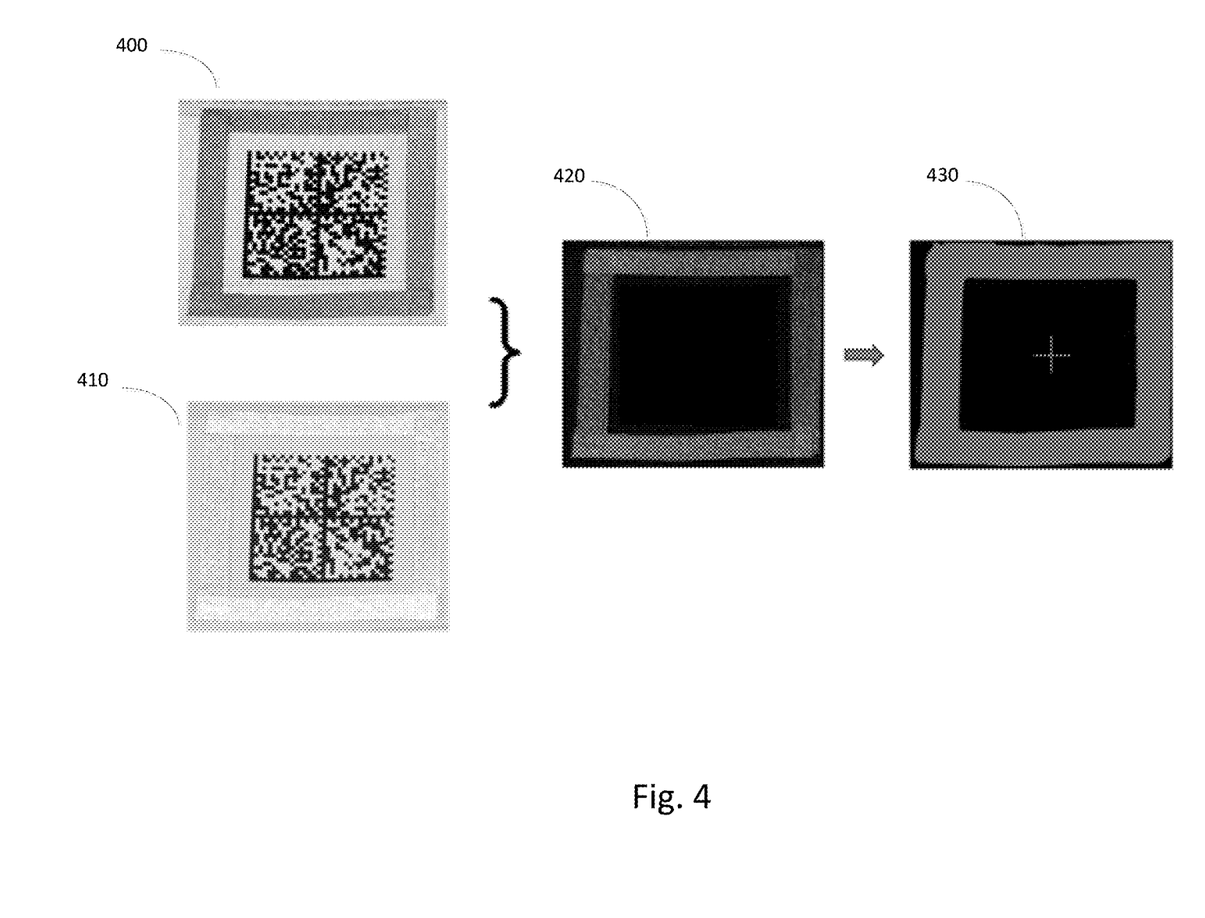
FIG. 4 is a diagram illustrating the generation of a difference and segmented image using both the first and second captured images of FIGS. 1 and 2.

First, distortion function correction may be applied to each captured image (using information about the camera optics). Second, a difference image may be computed that represents the differences between the illuminated image and the non-illuminated image. Third, the difference image is segmented into separate areas, which may include filtering using size, color, shape, or other parameters. Image segmentation means defining a group of pixels with a specific characteristic. In accordance with one implementation, pixels of a specific color and intensity that are next to each other (i.e. contiguous regions) are found. The difference image 300 may also have some small artifacts (such a subtle edge outlines) that will be filtered out. This can be done using a blur filter and an intensity threshold filter. The results of the segmentation are shown in the segmented image 430 as depicted in FIG. 4. The three squares 330-332 in FIG. 3 may represent the segmented regions. (For simplicity, the segmented regions in FIG. 3 are shown as squares, but in practice some or all of the segmented regions in the image will not be perfect squares since the direction vector of the camera will rarely be perfectly aligned with the surface normal.) After the image has been segmented, the computing device 150 calculates the centroid for each segmented region 330-332. The centroid is the average X pixel coordinate and average Y pixel coordinate for that region. These X-Y coordinate pairs are used to compute the differences from the X-Y coordinate pair for the center of the image.

Referring again to FIG. 3, once the average pixel coordinates for each segmented region have been calculated, respective pan and tilt angles for each segment centroid position location in the image may be computed. These are the pan and tilt angles of the pan-tilt mechanism 123 that will be used to orient (i.e., direct) the laser range finder of the local positioning system 120 at each imaging target 130-132 on the object 105. The local positioning system 120 pan-tilt angles for the center of the image are already known, along with the distance to the object 105. The method for guiding the local positioning system 120 to aim at each of the imaging targets 130-132 uses the pixel offsets for each of the centroids from the center of the image, the current field-of-view angle of the camera 125, and the distance to the target at the center of the image to compute offset pan and offset tilt angles, which are fed to the local positioning system 120 by the computing device 150. The computing device 150 instructs the local positioning system 120 to perform automated local positioning measurements of the locations corresponding to the centroids of the segmented regions using the offset pan and offset tilt angles. This means that the laser range finder is aimed at each imaging target 130-132 in turn and the range, pan and tilt data for each imaging targets 130-132 is measured.

Referring now to FIG. 4 and further referencing FIG. 3, FIG. 4 depicts an illustration of generating the difference image 420 and segmented image 430. As discussed in FIG. 3, the computing device 150 may utilize a first image 400 and a second image 410 to generate a difference image 420 and further generate a segmented image 430. As one example, the first image 400 in FIG. 4 is a zoomed-in view of a single imaging target 130 in a non-illuminated state while the second image 410 is a zoomed-in view of the same imaging target 130, but in an illuminated state. With further processing, a segmented image 430 may result. In furtherance of the example, the segmented image 430 may be used to assist the local positioning system 120 in locating the center region of the imaging target 130.

Figure 5:
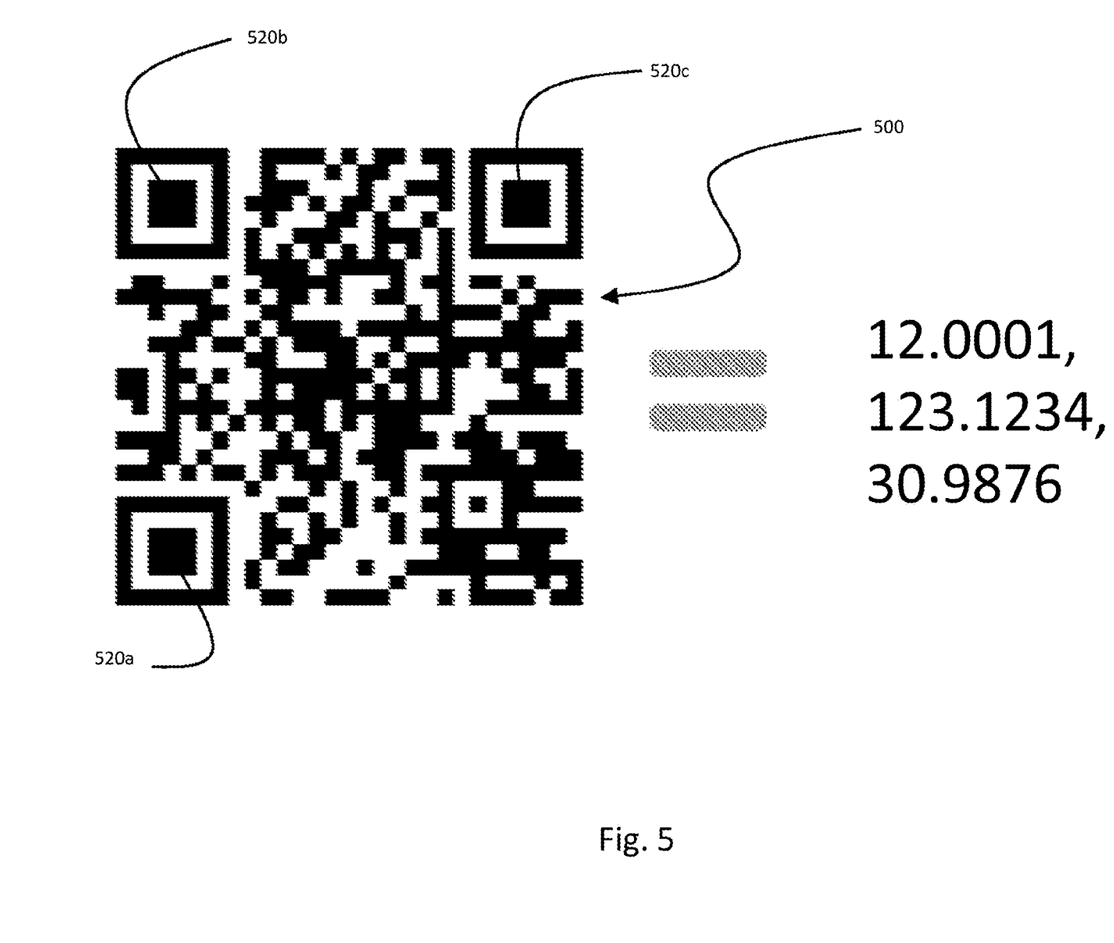
FIG. 5 depicts a Quick Response (QR) code.

FIG. 5 depicts an illustration of a zoomed-in view of a Quick Response (QR) code 500. QR codes 500 are just one example of a machine-readable code located at each imaging target 130-132. The imaging targets 130-132 referenced in FIGS. 1 and 2 may also contain other types of machine-readable codes or labels. Generally, the QR code 500 is bounded or surrounded by a passive marker. For example, imaging target 130 containing QR code 500 may be bounded by passive marker 130a as depicted in FIG. 1. The location information contained within each imaging target 130-132 defined in terms of the local coordinate system of the object 105 may be stored in a data payload region of the QR code 500.

The QR code 500 pattern internal data may provide specific coordinates defined in the coordinate system of the target object 105, as shown in FIG. 5 for QR code 500 pattern with example Cartesian coordinates x=12.0001, y=124.1234 and z=30.9876 as embedded data. This data may be acquired from a CAD database or other reference source. Orientation, a unique identifier tag string, or other information may also be encoded into the data payload region of the QR code 500. Placement of the QR code 500 pattern at that location then allows the precise identification of a location within the coordinate system of the object 105 or other structure on which the QR code 500 pattern is placed.

While QR code 500 patterns will be used for the description of implementations herein, alternative data markers may be employed. Any source that supplies relative position and orientation data may be employed such as UPC standard bar codes, Data Matrix (ECC 200) 2D matrix bar codes, Maxi Code 2D matrix bar code (used by UPS, public domain), Radio Frequency Identification (RFID) passive tags that require a radio source (reader) to energize them, or Active RFID (self-powered RFID tags) for alternative implementations.

Figure 6A:
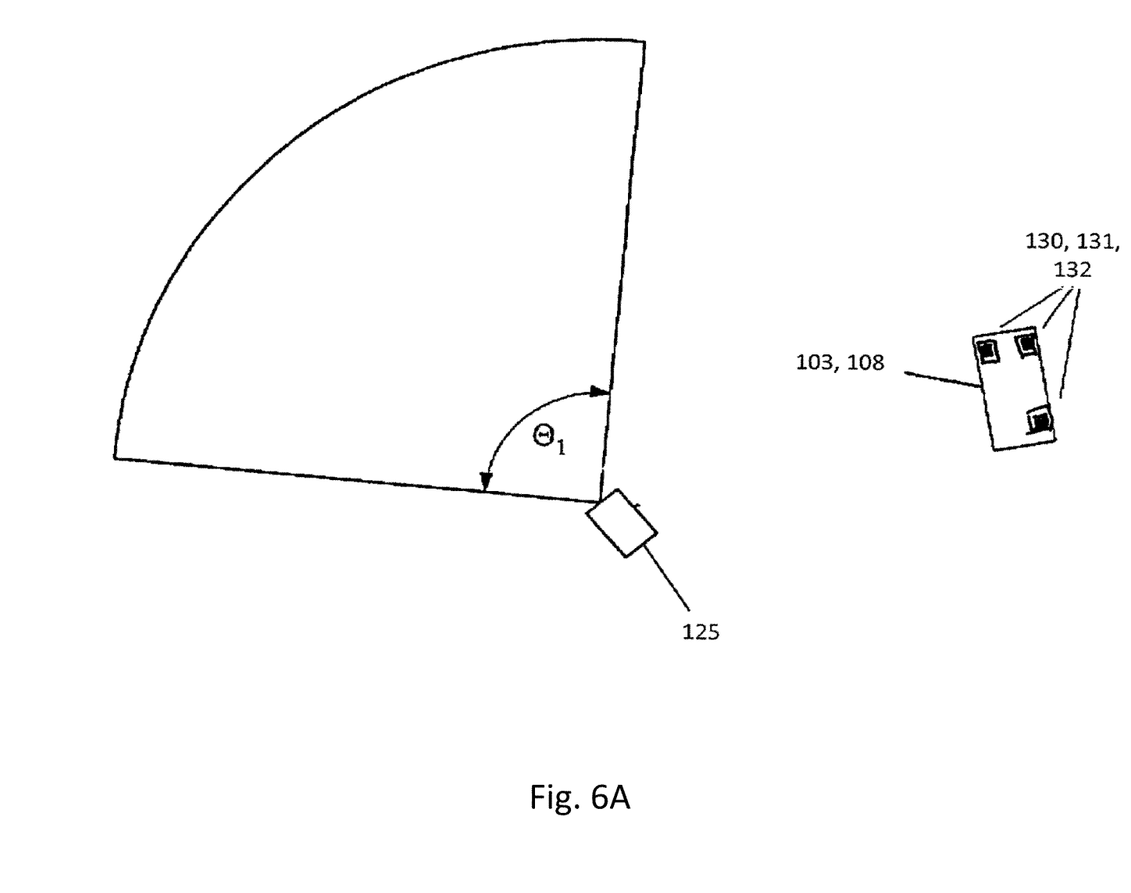
FIGS. 6A-6C are schematic views of a local positioning system equipped with a camera to scan and locate imaging targets on a surface of an object.
Figure 6B:
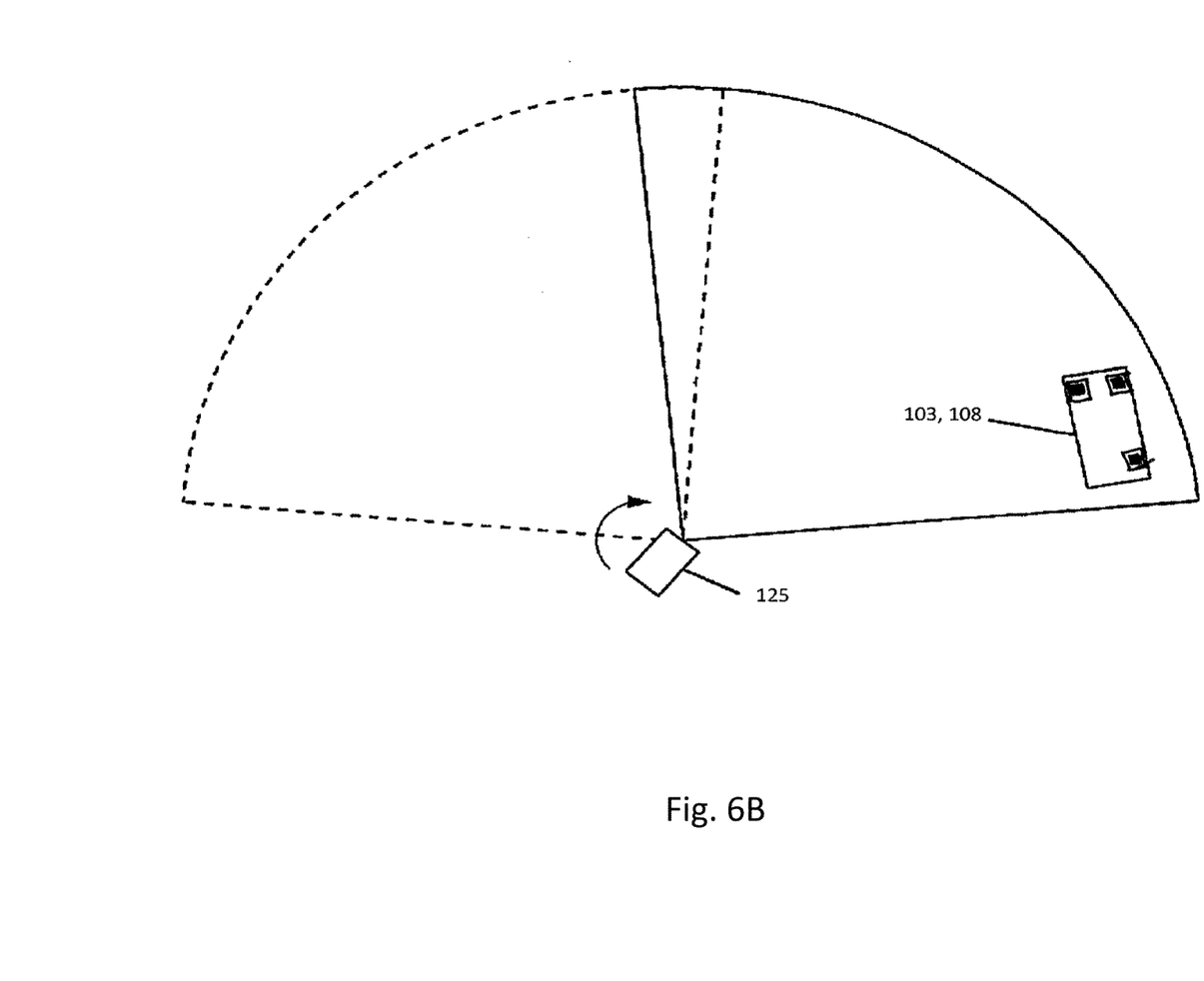
Figure 6C:
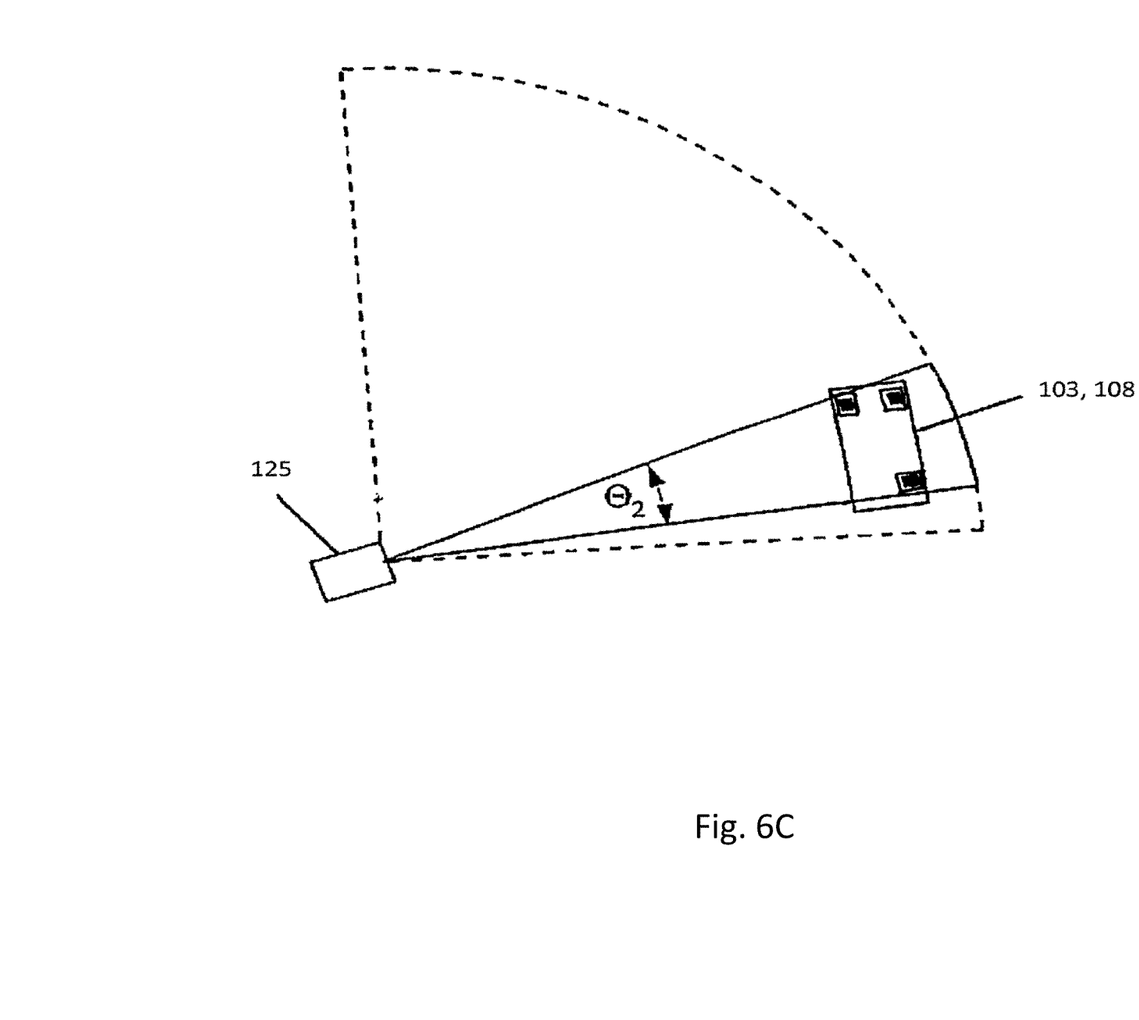

Referring now to FIGS. 6A-6C, FIGS. 6A-6C illustrate a search and scanning process for locating the imaging targets 130-132. The local positioning system 120 of FIGS. 1 and 2 are initially aimed at the object 105 with a wide field-of-view angle by the camera 125. The imaging targets 130-132 may be located anywhere in the environment, and in general may not be known to the system before the process begins, which means that in order to read the imaging targets 130-132, the local positioning system 120 may need to find them first. The process for locating the imaging targets 130-132 involves acquiring a mosaic of slightly overlapping wide-angle images of the environment in which the local positioning system 120 is set up. This image acquisition involves changing the pan and tilt angles of the local positioning system 120 pan-tilt mechanism 123 and setting an appropriate camera field-of-view (zoom value) to take pairs images. The process of changing the orientation with the pan-tilt mechanism 123 and taking pairs of images continues until a sufficient number (typically three) of the imaging targets 130-132 have been located.

As seen in FIG. 6A, the process starts by setting a wide field-of-view angle ($\theta_1$) and capturing a first image with the camera 125 of a non-illuminated region 103 and capturing a second image with the same field of view camera 125 of an illuminated region 208. As described in FIG. 3, a difference image 300 may then be computed to determine if one or more candidate imaging targets 130-132 are within the current field-of-view of the camera, if a sufficient number of candidate imaging targets 130-132 are not found, the local positioning system 120 aim direction may be changed using the pan-tilt mechanism 123 to rotate the camera 125 to view another region in the workspace, where the new field-of-view region may partially overlap the previous field-of-view region (shown in FIG. 6B), after which the two images (illuminated and non-illuminated) of the environment are captured. This search process involving rotation of the aim direction and cycling of the illumination lights continues until a sufficient number of candidate imaging targets 130-132 have been located in the environment. In some embodiments, it may be possible to center the aim direction and then narrow the camera field-of-view ($\theta_2$) to frame all of the candidate imaging targets 130-132, as shown in FIG. 6C, but in other embodiments, the candidate imaging targets 130-132 may be located further apart and not fit within the initial field-of-view of the camera 125. Once sufficient candidate imaging targets 130-132 have been located, the local positioning system 120 may instruct the pan-tilt mechanism 123 to aim the camera 125 at the center region of one of the candidate imaging targets 130-132, zoom in on that imaging targets 130-132 (based on the extents determined in the image processing step), and then acquire a close-up (enhanced) image of the imaging targets 130-132. From this enhanced image, the payload within the imaging target 130-132 may be read or decoded (which may be in the form of a QR code, DataMatrix code, barcode, or some other machine-readable form). At this point, pan-tilt angles and a distance reading of the center point of the imaging targets 130-132 may be acquired by the local positioning system 120. But if the payload cannot be decoded into a usable format, the candidate imaging targets 130-132 may be rejected and the process continues the search from where it left off until sufficient valid imaging targets 130-132 have been located. In alternate embodiments, the re-orientation of the camera 125 aim direction, zoom-in, and attempt at decoding the payload may be instructed to take place immediately after a potential candidate imaging targets 130-132 has been located.

Figure 7A:
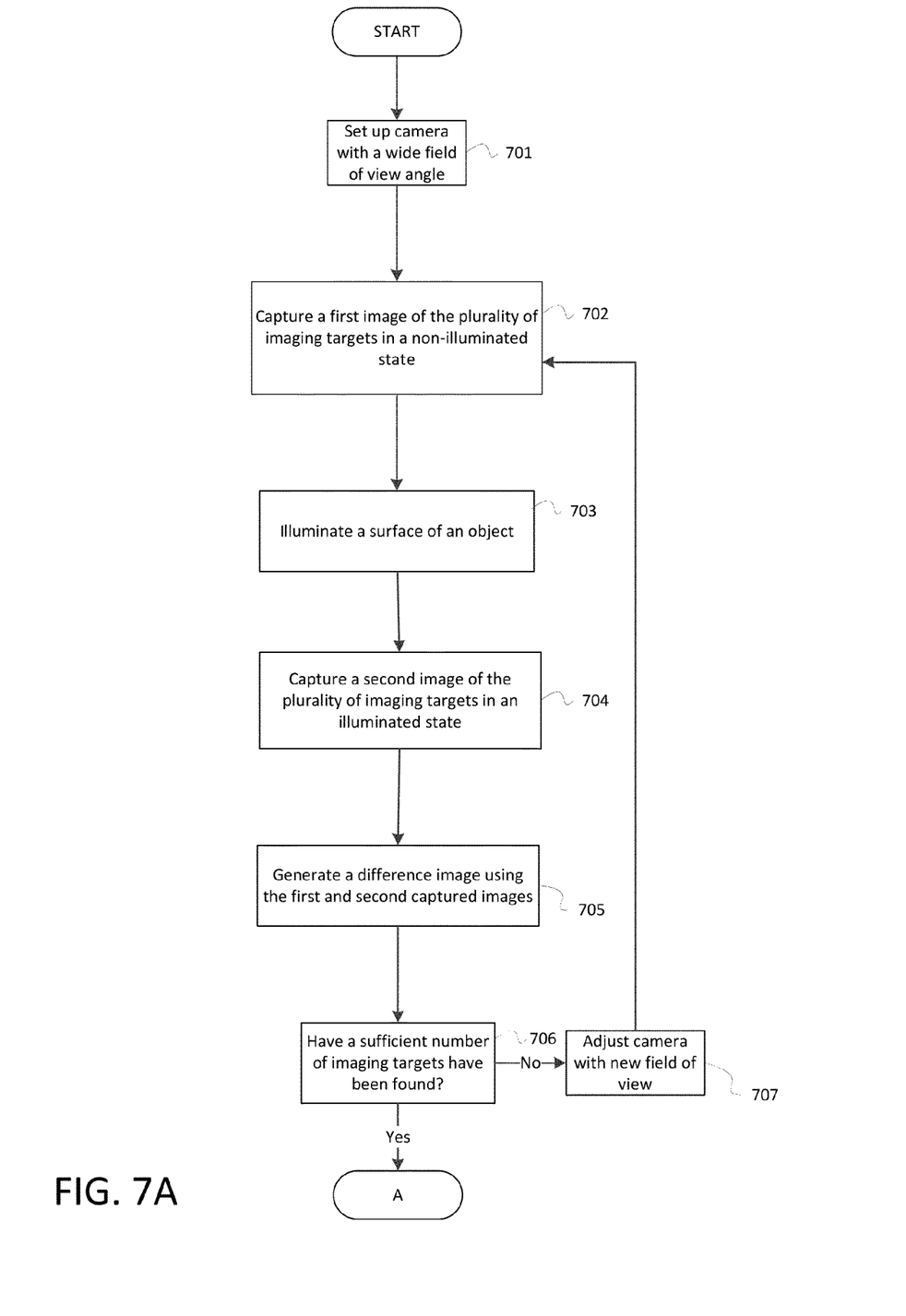
FIGS. 7A and 7B illustrate a flowchart representing an inventive process for calibrating the local positioning system.
Figure 7B:
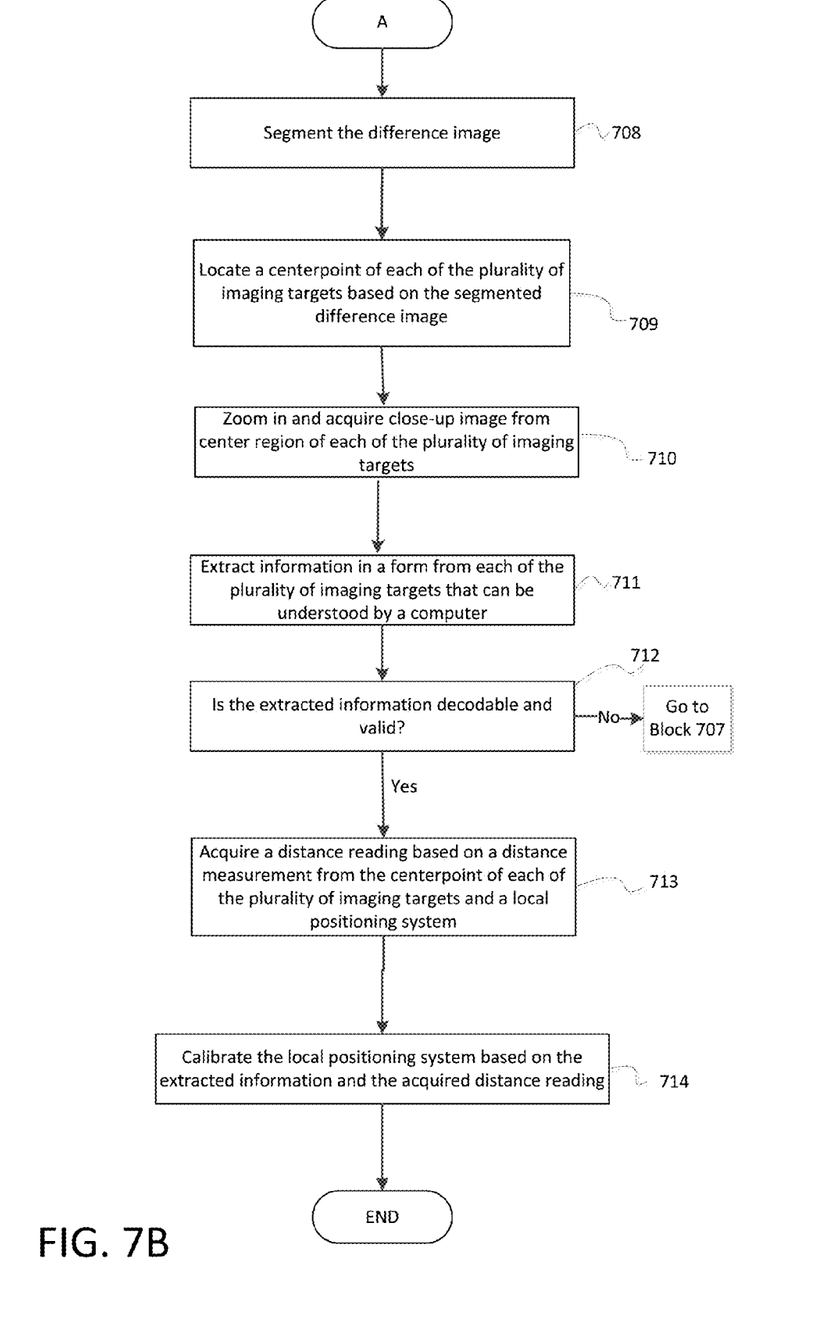

Referring now to FIGS. 7A & 7B and further referencing FIGS. 1-6, a flowchart 700 is illustrated. The flowchart 700 shows instructions as set forth and executed by at least one or more computing devices that may be communicatively coupled to one or more processing devices. Hence, when directed by the computing device, the system may then perform the instructions as set forth in flowchart 700 of FIGS. 7A & 7B.

Referring to block 701, the system may initially set the camera in the local positioning system to aim at a surface of an object with a wide field-of-view angle. Since imaging targets may be located anywhere in the environment, the system may have to go through a process (which are described in blocks 702-713) before being able to fully locate and capture a sufficient number (typically three) imaging targets prior to calibrating or re-calibrating the local positioning system.

Referring to block 702, the system may direct a local positioning system (equipped with a camera) to capture a first image of a plurality of imaging targets located on a surface of an object in a non-illuminated state. In an aspect, the camera may further be equipped with a ring light. The ring light may be in the on or off state. Block 702 illustrates an embodiment where the camera's ring light may be in the off state when the first captured image of the imaging targets is taken.

Referring to block 703, block 703 illustrates that the ring light of the camera may be in the on state and further configured to illuminate a surface of an object.

Further in block 704, the system may direct the local positioning system to capture a second image of the plurality of imaging targets. Block 704 illustrates an embodiment where the second captured image may be in an illuminated state. The second image may capture the same imaging targets as the first image captured in block 702; however, the only difference is that the second image may be illuminated and the first image may not be.

In block 705, a difference image may be generated using the results of the captured first and second images from blocks 702 and 704.

In block 706, the system may determine whether or not a sufficient number of imaging targets have been found in total based on all the generated difference images that have been analyzed so far. If a sufficient number of imaging targets are not found, then the system may proceed to block 707. If a sufficient number of imaging targets have been found, then the system may proceed to block 708.

In block 707, the local positioning system's aim direction may be changed using the pan-tilt mechanism to rotate the camera in order to view another region in the environment. The new field-of-view region may partially overlap the previous field-of-view region (as shown in FIG. 6B), after which a first and a second image (illuminated and non-illuminated) of the environment are captured again. This search process involving rotation of the aim direction and cycling of the illumination lights may continue until a sufficient number of imaging targets have been located in the environment. Once the sufficient amount of imaging targets has been located by going through blocks 702-706, the system may then proceed to block 708.

Referring to block 708, block 708 illustrates that after one or more imaging targets have been located based on the mosaic of images captured by the local positioning system, the difference image may be computed and then segmented. The imaging targets may be located anywhere in the environment. The process for locating the imaging targets involves acquiring a mosaic of slightly overlapping wide-angle images of the environment in which the local positioning system is set up. This image acquisition involves changing the pan and tilt angles of the local positioning system pan-tilt mechanism and setting an appropriate camera field-of-view (zoom value) to capture pairs of images. The process of changing the orientation with the pan-tilt mechanism and capturing pairs of images continues until a sufficient number (for example, three) of the imaging targets have been located. Thus, once the process of finding one or more imaging targets from the acquired mosaic of slightly overlapping wide-angle images of the environment has been completed, the difference image may be computed and then segmented.

Referring to blocks 709, 710, and 711, the system, after segmentation of the difference image, may locate the center point of each of the plurality of imaging targets to further extract information (as described in block 709). The local positioning system may instruct the pan-tilt mechanism to aim the camera at the center region of one of the imaging targets, zoom in on that imaging target (based on the extents determined in the image processing step), and then acquire a close-up (enhanced) image of the imaging target (as described in block 710). Information may be extracted from a machine-readable payload located in the central region of each imaging target (as described in block 711). Each imaging target may include a QR code, Data Matrix (DM), other two-dimensional (2D) code, barcode, other one-dimensional (1D) code, or other code of similar functionality that may be machine readable or understood by a computer. The machine-readable code may contain information related to the position of the center point on the surface of the object and may be used to help the computing device calibrate the local positioning system. The machine-readable code may also include additional information beyond just position information. For example, the machine-readable code may contain orientation information, part number, information on whether the object has been serviced, damage information, contact information (email, web site, etc.), or other information related to the part or location on the target object.

Referring to block 712, the system may determine whether the extracted information from the acquired close-up image contains a valid machine-readable label. If the machine-readable label is not decodable into a usable format or cannot be read by the system, then the system may return back to block 707 and repeat the search process of finding valid imaging targets. If the machine-readable label is valid or can be read by the system, then the system may continue on to block 713.

Block 713 illustrates that a distance reading may be acquired based on the distance measurement from the center point of each imaging target with respect to the local positioning system. The distance measurement and the extracted information from block 711 may then be utilized in block 714 to help calibrate the local positioning system.

Block 714 illustrates that the local positioning system may use both the distance reading from block 713 and the extracted information from block 711 to calibrate itself. In essence, block 714 illustrates that the local positioning system may calibrate or re-calibrate the position and orientation offset of the system in relation to the imaging targets located on the surface of the object based on acquired measurements and information.

The foregoing description of several methods and systems has been presented for purposes of illustration. It is not intended to be exhaustive or to limit the methods and systems to the precise forms and steps disclosed, and obviously many modifications and variations are possible in light of the above teaching.

The terminology used in the description of the invention herein is for the purpose of describing particular implementations only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used in the claims, the term "computing device" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

As used herein, the term "location" comprises position in a fixed three-dimensional coordinate system and orientation relative to the coordinate system, and the term "passive marker" means a retro-reflective marker.

It will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore, it is intended that the claims not be limited to the particular implementations disclosed herein.

What is claimed:
1. A method for calibrating a local positioning system, comprising:
  capturing a first image of a plurality of imaging targets (130-132) in a first state of illumination, wherein the imaging targets are on a surface of an object;

illuminating the plurality of imaging targets to a second state of illumination from a source at a location from which the first image was captured, the imaging targets responding differently to the second state of illumination than the first state of illumination;

capturing, from the location, a second image of the plurality of imaging targets (130-132) in the second state of illumination;

generating a difference image (300) using the first and second captured images;

segmenting the difference image;

locating a center point of each of the plurality of imaging targets based on the segmented difference image (300);

extracting information (500) from each of the plurality of imaging targets;

acquiring a distance reading based on a distance measurement from the center point of each of the plurality of imaging targets (130-132) and the local positioning system (120); and calibrating the local positioning system (120) based on the extracted information and the acquired distance reading.

2. The method of claim 1, wherein extracting information from each of the plurality of imaging targets comprises extracting information related to the position of the center point on the surface of the object.

3. The method of claim 2, wherein the information related to the position of the center point is represented in three dimensional coordinates.

4. The method of claim 2, wherein the information is stored in a machine-readable code.

5. The method of claim 2, wherein the information from each of the plurality of imaging targets is extracted by adjusting a field of view of the local positioning system to zoom into the center region of each of the plurality of imaging targets.

6. The method of claim 5, wherein adjusting the field of view of the local positioning system to zoom into the center region of each of the plurality of imaging targets further comprises:

acquiring a close-up image of the center region of each of the plurality of imaging targets;

reading a machine-readable label from the close-up image; and in response to reading the machine-readable label and not being able to decode the machine-readable label into a usable format, capture an additional first image of a plurality of imaging targets in a non-illuminated state and an additional second image of the plurality of imaging targets in an illuminated state to generate an additional difference image.

7. The method of claim 1, wherein capturing a first image of a plurality of imaging targets in a first state of illumination comprises capturing the first image while under no illumination, and wherein capturing a second image of the plurality of imaging targets in a second state of illumination comprises illuminating at least a portion of a surface of an object and capturing the second image under illumination.

8. The method of claim 1, wherein calibrating the local positioning system further comprises computing a relative position and orientation offset between the local positioning system and the plurality of imaging targets.

9. The method of claim 1, wherein calibrating the local positioning system occurs when at least three valid imaging targets are identified.

10. The method of claim 1, wherein generating a difference image using the first and second captured images further comprises:

determining whether a sufficient number of imaging targets are captured; and in response to determining that a sufficient number of imagining targets are not found, aim the local positioning system to a new region on the surface of the object to acquire an additional first image of a plurality of imaging targets in a first state of illumination, and an additional second image of the plurality of imaging targets in second state of illumination different from the first state to generate an additional difference image.

11. A system, comprising:

one or more memories having stored thereon computer-readable instructions that, upon execution by a computing device, cause the system to:

capture a first image of a plurality of imaging targets in a non-illuminated state, wherein the imaging targets are on a surface of an object;

illuminate at least a portion of the surface of the object from a source at a location from which the first image was captured, the imaging targets reflecting at least some of the illumination;

capture, from the location from which the first image was captured a second image of the plurality of imaging targets reflecting the at least some of the illumination;

generate a difference image using the first and second captured images;

segment the difference image;

locate a center point of each of the plurality of imaging targets based on the segmented difference image;

extract information from each of the plurality of imaging targets;

acquire a distance reading based on a distance measurement from the center point of each of the plurality of imaging targets and location; and calibrate a local positioning system based on the extracted information and the acquired distance reading.

12. The system of claim 11, wherein the center region of each of the plurality of imaging targets comprises information related to a position of the center point of the imaging target on the surface of the object.

13. The system of claim 12, wherein the information related to the position of the center point is represented in three dimensional coordinates.

14. The system of claim 11, further comprising one or more memories having stored thereon computer-readable instructions that, upon execution by the computing device, cause the system to:

acquire a close-up image of the center region of each of the plurality of imaging targets;

read a machine-readable label from the close-up image; and in response to reading the machine-readable label and not being able to decode the machine-readable label into a usable format, capture an additional first image of a plurality of imaging targets in a non-illuminated state, and an additional second image of the plurality of imaging targets in an illuminated state to generate an additional difference image.

15. The system of claim 11, wherein each of the plurality of imaging targets includes a reflecting portion bounding a machine-readable label having the extracted information.

16. The system of claim 11, further comprising one or more memories having stored thereon computer-readable instructions that, upon execution by the computing device, cause the system to form a plurality of segmented portions based on segmenting the difference image; and calculate a centroid for each of the plurality of segmented portions.

17. The system of claim 16, further comprising one or more memories having stored thereon computer-readable instructions that, upon execution by the computing device, cause the system to at least: locate a center point of each imaging target based on the calculated centroid from each of the plurality of segmented portions.

18. The system of claim 11, wherein the first captured image comprises a single image of the plurality of imaging targets in the non-illuminated state, and the second captured image comprises a single image of the plurality of imaging targets in the illuminated state.

19. The system of claim 11, wherein:
   the first image of the plurality of imaging targets and the second image of the plurality of imaging targets is captured by a camera;
   the source comprises a ring light attached to the camera.

20. The system of claim 11, further comprising one or more memories having stored thereon computer-readable instructions that, upon execution by the computing device, cause the system to at least scan the surface of the object until at least three valid imaging targets are identified.

\* \* \* \* \*